United States Patent [19]

Oda et al.

[11] 4,105,223
[45] Aug. 8, 1978

[54] INSTRUMENT PANEL FOR A VEHICLE

[75] Inventors: Takaaki Oda, Musashi-murayama; Kazuo Takeuchi, Chiba, both of Japan

[73] Assignee: Nissan Motor Company, Ltd., Japan

[21] Appl. No.: 727,572

[22] Filed: Sep. 28, 1976

[30] Foreign Application Priority Data

Oct. 31, 1975 [JP] Japan .................. 50/148787[U]

[51] Int. Cl.² .................. B60K 37/00; B60R 21/04
[52] U.S. Cl. .................................. 280/752; 180/90
[58] Field of Search ..................... 280/752; 180/90

[56] References Cited

U.S. PATENT DOCUMENTS

| 3,439,769 | 4/1969 | Brilmyer | 280/752 X |
| 3,549,469 | 12/1970 | Wilfert | 180/90 X |
| 3,806,154 | 4/1974 | Akiyama | 280/752 |
| 3,834,482 | 9/1974 | Wada | 280/752 X |
| 3,876,228 | 4/1975 | Hawkins | 280/752 |

Primary Examiner—Joseph F. Peters, Jr.
Assistant Examiner—Terrance L. Siemens

[57] ABSTRACT

An instrument panel comprises an elongated sheet member formed through the longitudinal length thereof with a plurality of depressions. The depressions provide for a weakening of resistance to deformation of the sheet member so that if the sheet member is struck by the passenger's head in a collision, it is permanently and plastically deformed and thus saves the passenger from injury.

5 Claims, 5 Drawing Figures

INSTRUMENT PANEL FOR A VEHICLE

The present invention relates in general to a panelling arrangement at the dashboard of a motor vehicle, and more particularly to a safety instrument panel which can protect a front seat passenger of the vehicle from being injured by striking his head against the instrument panel in a case of collision.

In collision, the upper body of the front seat passenger is thrown forwardly and impinged during the so-called jack knife effect with the head against the upper edge of the instrument panel. This will cause the typical intracranial injury of the passenger.

In order to lessen the force of the impact between the vehicle passenger's head and the instrument panel, some of the present day automotive instrument panels are covered with an energy absorbing padding made of foam materials or the like, and some of the panels are formed along the longitudinal length thereof with a plurality of slots for weakening the resistance to deformation of the panel.

In these procedures, however, the padding is limited in the amount of energy that it can absorb, and, the formation of the slots in the instrument panel will induce not only the low productivity of the instrument panel due to the complicated punching operation, but also the considerable deformation of the panel during the manufacturing. Furthermore, it is observed that the shock absorbing effect of the instrument panel with such slots are largely dependent on the position, thus causing an unbalanced shock absorbing effect of the panel.

Thus, the present invention is proposed to eliminate the above-mentioned drawbacks encountered in the prior art automotive instrument panel.

It is an object of the present invention to provide an improved safety instrument panel which is capable of sufficient deformation upon impact to contribute substantially to the safety of the front seat passengers.

It is another object of the present invention to provide an improved safety instrument panel which is simple in construction and economical to manufacture.

This and other objects and advantages of the present invention will become more apparent from the following description when taken in conjunction with the accompanying drawings, in which.

Figure 1:
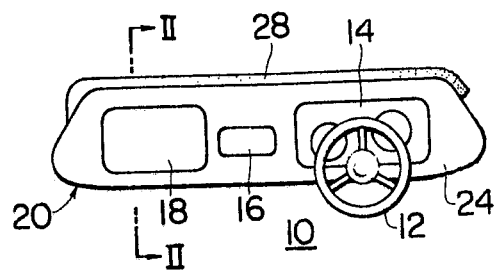
FIG. 1 is a sketch of an instrument panel in accordance with the present invention, the panel being shown combined with some parts stylized such as a steering wheel and a meter panel.

Referring now to FIG. 1 of the drawings, there is shown a safety instrument panel 10, according to the invention, which is equipped or combined with a steering wheel 12, a meter panel 14, a radio box 16 and a globe box 18. The safety instrument panel 10 comprises a stylized length of a sheet member 20 having a top surface 22 (FIG. 2) and a front surface 24 facing the passenger's compartment (not shown). The sheet member 24 is constructed of a plastic member, but if desired, it may be made of a metal plate.

Figure 2:
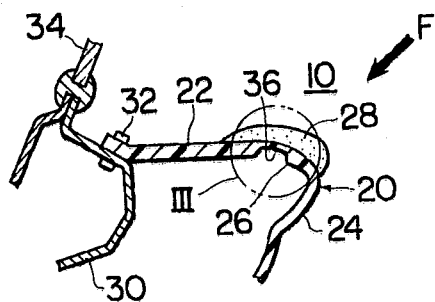
FIG. 2 is a sectional view taken along the line II—II of FIG. 1.

As well shown in FIG. 2, a portion 26 near the intersection of the top surface 22 and the front surface 24 is covered with a padding 28 made of foam material or the like. It is said that the portion 26 is most likely impacted by the passenger's head in a vehicle collision. The sheet member 20 is firmly fixed at its foward end to a laterally extending frame member 30 by suitable fastener such as a bolt 32. As shown, the frame member 30 is continued forward to the bottom edge of a windscreen 34.

Figure 3:
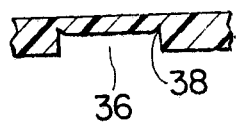
FIG. 3 is an enlarged view of a portion indicated by a mark III.
Figure 4A:
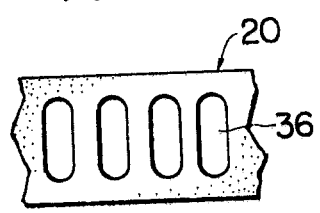
FIGS. 4A and 4B are front views of two improved sheet members for construction of the instrument panel of the invention, these sheet members being shown formed with a plurality of depressions, respectively.
Figure 4B:
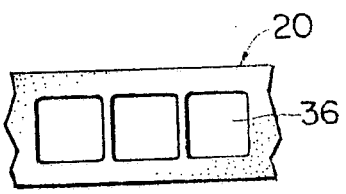

In the inner side area of the above-mentioned portion 26, there is formed with a plurality of spaced parallel depressions 36 which extend through the longitudinal length of the sheet member 20. The depressions 36 are oriented substantially perpendicularly to the longitudinal axis of the sheet member 24. These depressions 36 provide for a weaking of resistance to deformation of the sheet member 20 over selected area of the instrument panel 10 without impairing the structual rigidity of the entire instrument panel 10. The shape of each of the depressions may be oval and/or square as shown in FIGS. 4A and 4B. Furthermore, depressions may be formed in the upper side area of the portion 26 for the same reason as mentioned. Furthermore, as shown in FIG. 3, a small groove 38 may be arranged around each of the depressions 36 so that the resistance of the sheet member 20 is more weakened. Now, it should be noted that if the member 20 is made of a metal plate, the depression formation is made by means of stamping and-/or notching work during its manufacturing.

When an impact shock is applied from the direction indicated by an arrow F by the passenger's head in an area wherein the depression 36 are formed, deformation of the padding 28 occurs at first to absorb a certain amount of impact energy. Then, deformation of the sheet member 20 takes place. The depression arrangement thus formed tends to conform to the shape of the object impacted against the instrument panel 10. For instance, an arcuate head impacting the panel 10 would cause a progressive deformation of adjoining depression-separated sections of the sheet member 20. The impact forces are thus distributed over a large area, thereby reducing impact force at any particular point.

Now, according to our several experiments with respect to the safety standard of the instrument panel, the following was revealed, that is, the force of impact with an instrument panel should not exceed 80 times the force of gravity (G's) during more than 3 milliseconds measured for a 16 pound ($\doteq$ 7.26 kg) ball with a diameter of 6.5 inch ($\doteq$ 16.5 cm) and swinging through an arc at a velocity of 15 miles per hour.

Thus, in forming the depression in the sheet member 20, the above-mentioned standard should be referred.

With the above, it will be obvious that since the safety instrument panel of the present invention has a portion, to which a passenger's head is most likely impacted, formed with a plurality of depressions to weaken the resistance of the portion to its deformation, the impact force applied to the portion by the passenger's head is preferably and smoothly absorbed thereby saving the passenger.

Although, in the previous description, only few embodiments are shown, it is to be noted that the present invention is not limited to the embodiments and that various changes and modifications may be made without departing from the scope of the invention, as described in the appended claims.

What is claimed is:

1. A safety instrument panel for a vehicle, comprising:
   an elongated sheet member laterally set at a front section of a passenger compartment of said vehicle;
   means for weakening the resistance to deformation of areas of said elongated sheet member and comprising a plurality of recesses having relatively substantial surface area formed in said elongated sheet member, said areas being most likely impacted by the passenger's head during a vehicle collision; and
   padding secured to outer surfaces of said enlongated sheet member so as to cover said areas.

2. A safety instrument panel as claimed in claim 1, in which said recesses are arranged to be spaced from and parallel to each other and oriented substantially perpendicularly to the longitudinal axis of said elongated sheet member.

3. A safety instrument panel as claimed in claim 2, in which said recesses extend along the longitudinal axis of said elongated sheet member.

4. A safety instrument panel as claimed in claim 1, in which each of said recesses is formed at its circumference with a groove for more weakening the resistance to deformation of said area of said elongated sheet member.

5. A safety instrument panel for a vehicle, comprising:
   an elongated sheet member adapted to be laterally set at a front section of a passenger compartment of said vehicle;
   means for weakening the resistance to deformation of areas of said elongated sheet member and comprising a plurality of recesses having relatively substantial surface area formed in said elongated sheet member, said areas being most likely impacted by the passenger's head during a vehicle collision; and
   padding secured to outer surfaces of said elongated sheet member so as to cover said areas;
   said recesses being arranged to be spaced from and parallel to each other and located substantially normal to the longitudinal axis of said elongated sheet member, each of said recesses being formed at its circumference with a groove for more weakening the resistance to deformation of said area of said elongated sheet member.

* * * * *